United States Patent
Miller

(10) Patent No.: US 10,100,683 B2
(45) Date of Patent: Oct. 16, 2018

(54) COMPRESSED GAS ENGINE

(71) Applicant: Michael Miller, Annapolis, MD (US)

(72) Inventor: Michael Miller, Annapolis, MD (US)

( * ) Notice: Subject to any disclaimer, the term of this patent is extended or adjusted under 35 U.S.C. 154(b) by 0 days.

(21) Appl. No.: 15/701,605

(22) Filed: Sep. 12, 2017

(65) Prior Publication Data

US 2018/0003086 A1   Jan. 4, 2018

Related U.S. Application Data

(63) Continuation-in-part of application No. 14/582,234, filed on Dec. 24, 2014, now Pat. No. 9,765,758.

(51) Int. Cl.
| | | |
|---|---|---|
| F01K 25/08 | (2006.01) | |
| F01D 1/18 | (2006.01) | |
| F03G 7/10 | (2006.01) | |
| F01K 27/00 | (2006.01) | |

(52) U.S. Cl.
CPC ............. F01K 25/08 (2013.01); F01D 1/18 (2013.01); F03G 7/10 (2013.01); F01K 27/00 (2013.01)

(58) Field of Classification Search
CPC . F03B 17/005–17/04; F03G 3/02; F03G 3/08; F03G 7/08; F03G 7/10
USPC ........... 60/495–507, 675, 371–372, 639–640
See application file for complete search history.

(56) References Cited

U.S. PATENT DOCUMENTS

| | | |
|---|---|---|
| 243,909 A | 7/1881 | Iske |
| 458,872 A | 9/1891 | Van Depoele |
| 3,358,451 A | 12/1967 | Feldman et al. |
| 3,441,482 A | 4/1969 | Avery |
| 3,546,473 A | 12/1970 | Rich |
| 3,636,706 A | 1/1972 | Minto |
| 3,659,416 A | 5/1972 | Brown |
| 3,901,033 A | 8/1975 | Mcalister |
| 3,975,097 A | 8/1976 | Minto |
| 4,051,678 A | 10/1977 | Yates |
| 4,131,171 A | 12/1978 | Keyes |
| 4,291,755 A | 9/1981 | Minto |
| 4,326,132 A | 4/1982 | Bokel |
| 4,342,920 A | 8/1982 | Bucknam |
| 4,399,368 A | 8/1983 | Bucknam |
| 4,403,643 A | 9/1983 | Minto |

(Continued)

FOREIGN PATENT DOCUMENTS

| | | |
|---|---|---|
| GB | 1251484 A | 10/1971 |
| GB | 1301214 A | 12/1972 |

OTHER PUBLICATIONS

"The Minto Wheel", The Mother Earth News, Issue 40, Jul. 1976.

(Continued)

*Primary Examiner* — Mark Laurenzi
*Assistant Examiner* — Mickey France

(57) ABSTRACT

An engine has spherical pressure vessels attached to a continuous vertical conveyor. Each spherical pressure vessel has an operating pressure sufficient to hold gas at a pre-defined pressure. At least one gas compressor is in communication with each spherical pressure vessel, and the gas compressor is capable of compressing a gas in each pressure vessel to the pre-defined pressure. A pressure relief mechanism is in communication with each spherical pressure vessel. The pressure relief mechanism is capable of returning the gas in each vessel to atmospheric pressure. A plurality of reciprocating electrical generators is disposed in each spherical pressure vessel to convert the heat generated during pressurization to electrical power.

20 Claims, 8 Drawing Sheets

(56) References Cited

U.S. PATENT DOCUMENTS

| | | | |
|---|---|---|---|
| 4,637,211 | A | 1/1987 | White et al. |
| 5,028,903 | A | 7/1991 | Aubert |
| 5,216,401 | A | 6/1993 | Leupold |
| 5,228,293 | A | 7/1993 | Vitale |
| 5,382,936 | A | 1/1995 | Leupold et al. |
| 5,428,334 | A | 6/1995 | Leupold et al. |
| 5,428,335 | A | 6/1995 | Leupold et al. |
| 5,461,354 | A | 10/1995 | Rosenberg et al. |
| 5,506,558 | A | 4/1996 | Laube |
| 5,517,083 | A | 5/1996 | Whitlock |
| 6,286,310 | B1 | 9/2001 | Conrad |
| 6,688,048 | B2 | 2/2004 | Staschik |
| 6,978,610 | B2 | 12/2005 | Carnahan |
| 7,644,648 | B2 | 1/2010 | Minowa et al. |
| 7,692,320 | B2 | 4/2010 | Lemieux |
| 7,694,515 | B2 | 4/2010 | Miller |
| 8,539,765 | B2 | 9/2013 | Miller |
| 8,633,604 | B2 | 1/2014 | Miller |
| 8,791,781 | B2 | 7/2014 | Miller |
| 2002/0100576 | A1 | 8/2002 | Hua |
| 2004/0140875 | A1 | 7/2004 | Strom |
| 2005/0246919 | A1 | 11/2005 | Delons |
| 2005/0252206 | A1 | 11/2005 | Holmevik et al. |
| 2006/0225414 | A1 | 10/2006 | Fan |
| 2009/0309371 | A1 | 12/2009 | Ballard |
| 2011/0041499 | A1 | 2/2011 | Godwin |
| 2011/0169277 | A1 | 7/2011 | Miller |
| 2013/0062457 | A1 | 3/2013 | Deakin |
| 2013/0205768 | A1 | 8/2013 | Kim |
| 2013/0270635 | A1 | 10/2013 | Parris et al. |
| 2013/0270835 | A1 | 10/2013 | Pingitore et al. |
| 2014/0109991 | A1 | 4/2014 | Travis |
| 2015/0211479 | A1 | 7/2015 | Tai et al. |

OTHER PUBLICATIONS

"Wally Minto: Freon Power Wheel" from www.rexresearch.com (37 pages).
"Wally Minto's Wonder Wheel", Popular Science, Mar. 1976.
International Search Report and Written Opinion in PCT Application PCT/US08/54243 dated Jul. 18, 2008.

COMPRESSED GAS ENGINE

CROSS-REFERENCE TO RELATED APPLICATIONS

This application is a continuation-in-part of co-pending U.S. patent application Ser. No. 14/582,234 filed Dec. 24, 2014. The entire contents of that application is incorporated herein by reference.

FIELD OF THE INVENTION

The present invention is directed to engines and compressed gas systems.

BACKGROUND OF THE INVENTION

A slow moving, high torque engine or generator is known that operates on a very small temperature differential. This engine is commonly referred to as a Minto Wheel after its inventor Wallace Minto. The engine is arranged as a wheel that contains a series of sealed containers. The sealed containers are placed around the rim of the wheel and are aligned as diametrically opposed pairs. Each diametrically opposed pair is in fluid connection through a tube. The wheel rotates in a vertical plane. In any given pair at any given moment in time during the rotation, one of the containers is moving in a generally upward direction, and the other container is moving in a generally downward direction. At one position in the rotation, the containers are aligned vertically, with one container at the top being in the uppermost position and one container at the bottom being in the lowermost position. Each container moves between the uppermost and lowermost positions.

Each opposed pair of containers and the associated connecting tube form a sealed unit. Into each sealed unit a volume of a low-boiling liquid, for example propane, butane, carbon dioxide or Freon is introduced. For a given pair located at or near the vertically aligned position, most of the introduced volume of liquid is disposed in the lowermost container. The lowermost container is then exposed to a very mild increase in temperature, for example an increase of as little as 2° centigrade or about 3.5° F. The small temperature increase in the liquid in the lowermost container vaporizes a portion of the liquid, producing a higher pressure on the surface of the liquid. This pressure forces the liquid up the connecting tube and into the uppermost container. This transfer of liquid from the lowermost container to the uppermost container transfers mass to the uppermost container, causing the container to increase in weight while the lowermost container decreases on weight. Gravity pulls the uppermost container downward, turning the wheel in a manner similar to the turning of a water wheel. This rotational motion can be used for any desired mechanical work. Wheels of modest size can perform such tasks as pumping water for irrigation, grinding food grains and generating small amounts of machine power. The wheel turns relatively slowly, but produces enormous torque. This high torque rotational motion can be geared up to produce any speed desired at the final output shaft. Although output can be converted to higher speeds, the wheel or engine is most effective for applications that utilize high torque at low speed.

The horsepower produced by the rotating wheel is proportional to the product of torque and speed, i.e. revolutions per minute of the wheel. For a given wheel exposed to a given temperature difference between opposed containers, a particular maximum horsepower is produced when fully loaded. This maximum horsepower, i.e. the power output, of the wheel is proportional to the rate of heat transfer. Therefore, arrangements of an engine or generator that are not constrained by the rate of heat transfer into and out of a liquid are desired.

SUMMARY OF THE INVENTION

Systems in accordance with exemplary embodiments of the present invention utilize compressed gas and the weight increase associated with compressing a gas within a pressure vessel of fixed volume to transfer weight into and out of a pressure vessel. These pressure vessels are utilized in an engine that harvests the effects to gravity due to the increased weight of the pressure vessels. In one embodiment, a compressed air cycle is utilized to transfer or to establish a mass of compressed air at a given pre-determined height. The resultant potential energy is then reclaimed as the weighted pressure vessel descends from the pre-determined height. Once the pressure vessel completely descends, the pressurized gas is vented, for example to the atmosphere, returning the mass of the pressure vessel to its pre-pressurized level. Additional energy can be recaptured from the gas pressurization cycle by utilizing the resultant heat transfer or by using the released pressurized gas to drive, for example, a turbine.

In accordance with one exemplary embodiment, the present invention is directed to an engine having two pressure vessels arranged as a diametrically opposed pair. Each pressure vessel has an operating pressure sufficient to hold gas at a pre-defined pressure. At least one gas compressor is in communication with each pressure vessel, or sequentially so, and the gas compressor is capable of compressing a gas in each pressure vessel to the pre-defined pressure when the pressure vessel is at a pre-determined height to provide additional mass and the associated increase in potential energy in that pressure vessel when it is at that pre-determined height. A pressure relief mechanism is in communication with each pressure vessel, or sequentially so. The pressure relief mechanism is capable of returning the gas in each vessel to atmospheric pressure, or nearly so, at a point lower than the pre-determined height in a manner such that the potential energy is recovered at least in part and converted to mechanical energy. In one embodiment, the release of pressure is directed through a pneumatic generator which in operation utilizes a certain velocity of gas released into the pneumatic generator.

In accordance with one exemplary embodiment, the present invention is directed to an engine having two pressure vessels arranged as a diametrically opposed pair. Each pressure vessel has an operating pressure sufficient to hold gas at a pre-defined pressure. Suitable gases include air and argon. In one embodiment, the pre-defined pressure is at least about 2000 psi. In another embodiment, the pre-defined pressure is at least about 3000 psi. In one embodiment, each pressure vessel is sufficient to hold at least about 80 cubic feet of the gas at the pre-defined pressure. In one embodiment, the gas at the pre-defined pressure has a weight of at least about 3 pounds, preferably at least about 5 pounds.

The engine also includes at least one gas compressor in communication with each pressure vessel. The gas compressor is capable of compressing a gas in each pressure vessel to the pre-defined pressure. A pressure relief mechanism is provided in communication with each pressure vessel. The pressure relief mechanism is capable of returning the gas in each vessel to atmospheric pressure. In one embodiment, the engine includes a plurality of pressure vessels arranged in a plurality of diametrically opposed pairs. An arm is attached to both pressure vessels in each diametrically opposed pair such that each pressure vessel in each diametrically opposed pair is disposed on either end of the arm, and a rotatable shaft is provided in contact with each arm at a point along the arm between the two pressure vessels. Each arm is shaped to engage the shaft to impart rotational motion from the arm to the shaft during at least a portion of each rotation of the each around the shaft. In one embodiment, each arm has a length of at least about 100 feet. In one embodiment, at least one pneumatic powered electric generator is provided in communication with the pressure relief mechanism. In another embodiment, a gas storage tank is provided in communication with the pressure relief mechanism and the gas compressor.

Exemplary embodiments in accordance with the present invention are also directed to an engine having a continuous vertical conveyor with a pre-determined height and a plurality of pressure vessels connected to the continuous vertical conveyor for transport by the continuous vertical conveyor to and from the pre-determined height, e.g., at least about 100 feet. Each pressure vessel has an operating pressure sufficient to hold gas, e.g., air or argon, at a pre-defined pressure. In one embodiment, the gas at the pre-defined pressure has a weight of at least about 5 pounds. At least one gas compressor is provided in communication with each pressure vessel. The gas compressor is capable of compressing a gas in each pressure vessel to the pre-defined pressure. A pressure relief mechanism is provided in communication with each pressure vessel. The pressure relief mechanism is capable of returning the gas in each vessel to atmospheric pressure or of venting the gas through a turbine electrical generator.

In one embodiment, the continuous vertical conveyor contains a first rotatable wheel, a second rotatable wheel disposed vertically above the first rotatable wheel and a belt disposed around the first rotatable wheel and the second rotatable wheel. Rotation of the belt about the first rotatable wheel and the second rotatable wheel moves any given point along the belt to and from the pre-determined height. The plurality of pressure vessels is attached to the belt at a plurality of distinct points along the belt. In one embodiment, the plurality of distinct points is spaced apart by a distance of about one foot along the belt. In one embodiment, the engine includes an electrical generator in communication with at least one of the first rotatable wheel and the second rotatable wheel. In one embodiment, the engine includes at least one pneumatic powered electric generator in communication with the pressure relief mechanism.

Exemplary embodiments are directed to an engine containing a continuous vertical conveyor with a pre-determined height. In one embodiment, the pre-determined height comprises at least about 100 feet. A plurality of spherical pressure vessels is connected to the continuous vertical conveyor for transport by the continuous vertical conveyor to and from the pre-determined height. Each spherical pressure vessel has an operating pressure sufficient to hold gas at a pre-defined pressure. At least one gas compressor is provided in communication with each spherical pressure vessel. The gas compressor is capable of compressing a gas in each spherical pressure vessel to the pre-defined pressure. In one embodiment, the gas is argon. In one embodiment, the gas at the pre-defined pressure comprises a weight of at least about 5 pounds. A pressure relief mechanism is in communication with each spherical pressure vessel. The pressure relief mechanism is capable of returning the gas in each spherical pressure vessel to atmospheric pressure. At least one reciprocating electrical generator is disposed within each spherical pressure vessel. The reciprocating electrical generator converts heat generated during pressurization of the spherical pressure vessel into electric current. In one embodiment, the continuous vertical conveyor includes a first rotatable wheel, a second rotatable wheel disposed vertically above the first rotatable wheel and a belt disposed around the first rotatable wheel and the second rotatable wheel. Rotation of the belt about the first rotatable wheel and the second rotatable wheel moves any given point along the belt to and from the pre-determined height.

In one embodiment, each spherical pressure vessel has a diameter of up to about six feet. In one embodiment, the plurality of spherical pressure vessels is attached to the continuous vertical conveyor at a plurality of distinct points along the continuous vertical conveyor. Adjacent distinct points in the plurality of distinct points are spaced apart by a distance of about seven feet along the continuous vertical conveyor. In one embodiment, each reciprocating electrical generator is in communication with the gas compressor to supply electric current to the gas compressor. In one embodiment, the engine includes at least one pneumatic powered electric generator in communication with the pressure relief mechanism.

In one embodiment, each spherical pressure vessel includes a first hemispherical portion having a first flange and a second hemispherical portion having a second flange. The first flange is attached to the second flange to create the spherical pressure vessel. In one embodiment, each spherical pressure vessel maintains a vertical orientation with the first hemispherical portion disposed above the second hemispherical portion at all locations around the continuous vertical conveyor. In one embodiment, each spherical pressure vessel includes a gasket disposed between the first flange and the second flange. In one embodiment, each spherical pressure vessel includes a plurality of ports to provide access to an interior of the spherical pressure vessel. In one embodiment, each port is disposed in at least one of the first flange and the second flange. In one embodiment, the gas compressor is in communication with one of the ports in each spherical pressure vessel, and the pressure relief mechanism is in communication with one of the ports in each spherical pressure vessel. In one embodiment, each reciprocating electrical generator includes electrical leads. The electrical leads pass through at least one of the ports in the spherical pressure vessel containing the reciprocating electrical generator.

In one embodiment, the engine includes a pair of reciprocating electrical generators disposed in each spherical pressure vessel. In one embodiment, each reciprocating electrical generator in each pair of reciprocating electrical generators includes two containers arranged in a vertical alignment and having a top container and a bottom container and a generally cylindrical connecting arm in communication with each container and having a central hollow bore. The top container and bottom container are in fluid communication through the central hollow bore. A volume of a low boiling point liquid is disposed in the bottom container, and a wire coil is wrapped around a portion of the connecting arm. A buoyant spherical magnet is disposed in the central hollow bore. In addition, the engine further includes an active heat exchanger in each spherical pressure vessel. Each active heat exchanger is in communication with the bottom containers of the pair of reciprocating electrical generators contained in a given spherical pressure vessel to add heat to and remove heat from each bottom container and to transfer heat between the bottom containers in the pair of reciprocating electrical generators.

In one embodiment, each active heat exchanger includes a pair of first heat exchanger portions. Each first heat exchanger portion is in communication with the liquid disposed in one of the bottom containers. Each active heat exchanger also includes a pair of second active heat exchanger portions. Each second active heat exchanger portion is disposed in one of the bottom containers in a gas space above the liquid. In one embodiment, each active heat exchanger also includes an internal additional heat exchanger portion in communication with an internal ambient environment of the spherical pressure vessel and an external additional heat exchanger portion in communication with an external ambient environment of the spherical pressure vessel. The internal additional heat exchanger portion and external additional heat exchanger portion transferring heat among the internal ambient environment, the external ambient environment and the bottom containers.

DETAILED DESCRIPTION

Figure 1:
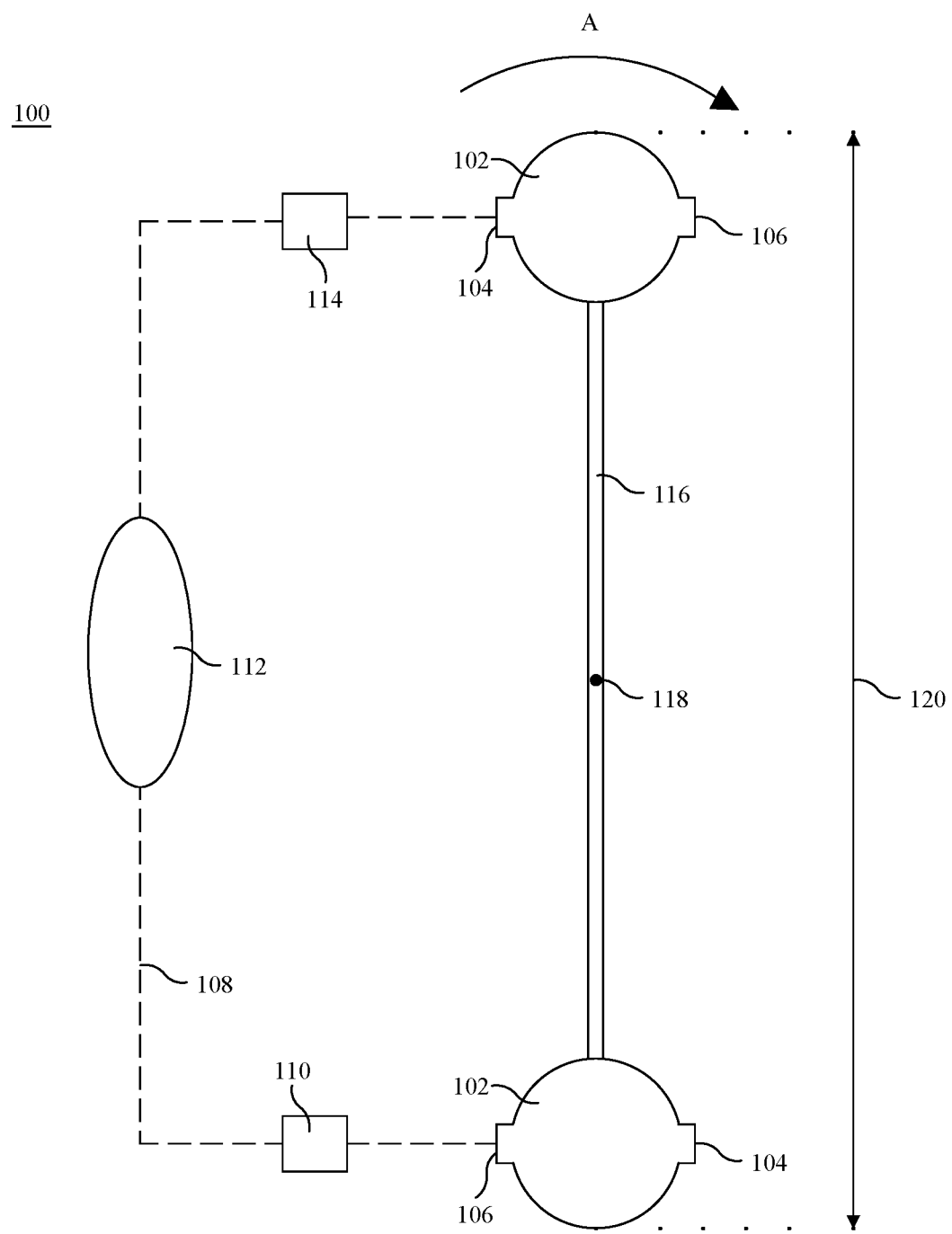
FIG. 1 is a schematic representation of an embodiment of an engine in accordance with the present invention.

Systems and methods in accordance with exemplary embodiments of the present invention are directed to a pneumatic "Minto Wheel" engine that utilizes compressed gas, and in particular, the increase in weight achievable by compressing the gas in a pressure vessel of a given size. The gas is compressed in a pressure vessel, for example, a metal cylinder or sphere such as a steel or aluminum cylinder or sphere. This increases the weight of the pressure vessel. The gas is compressed when the pressure vessel is located at a predetermined height, for example, about 100, 150, 200, 300 or 400 feet. The elevated pressure vessel with increased weight is in a state of potential energy based on the effect of gravity upon the pressure vessel. This potential energy is captured by allowing the pressure vessel to fall and accelerate downward under the effects of gravity. The captured potential energy is converted to usable work through the arms of the "Walley Wheel" or through a pulley and belt or chain system to which the pressure vessel is attached. In addition, a portion of the recaptured potential energy is used to return the depressurized pressure vessels to the pre-determined height.

Preferably, a plurality of pressure vessels are attached to a given wheel, for example in diametrically opposed pairs, or to a pulley and belt system. The gas in each pressure vessel is pressurized when that pressure vessel is located at the pre-determined height in an uppermost position. At the bottom of the cycle in a lowermost position, the compressed gas is allowed to be decompressed through a pressure relief mechanism attached to the pressure tank, to return the gas in the pressure vessel to atmospheric pressure. In one embodiment, the pressure relief mechanism is in communication with a pneumatic powered electrical generator to generate electricity while returning the gas in the pressure vessel to atmospheric pressure and the pressure vessel to its original weight. The wheel or pulley and belt system transports the empty cylinders up to the predetermined height under the rotation of the wheel or belt and pulley system driven by the descending of pressure vessels containing the pressurized gas.

In one embodiment, the pulley and belt system is vertically aligned with a plurality of pressure vessels attached along the length of the belt that rotates around the pulleys. Pressure vessels containing the pressurized gas pass down on one side of the pulley and belt system, and the pressure vessels with gas at atmospheric pressure are carried up on the other side. At the top, the gas in each pressure vessel is compressed to a pre-defined working pressure using a gas compressor, for example, an electric gas compressor, to provide the increased weight to the pressure vessel. Suitable sources for the electricity to run the gas compressor include, but are not limited to, electricity generated by the decompression of the pressure vessels through the pneumatic powered electric generator at the bottom of the rotation cycle and electricity generated by the wheel or pulley and belt system itself through gears that mechanically power an electrical generator.

The amount of work or power generated is proportional to the height of the system, i.e., the height at which the gas in the pressure vessels is pressurized. Other contributing factors include the capacity or volume of the pressure vessel, the operating pressure of the pressure vessel, the gas being compressed, e.g., air versus a noble gas, the type of wheel or pulley and belt system used, the efficiency of the electric gas compressors and of the pneumatic powered electrical generators. In addition to remaining fixed to the wheel or pulley and belt system, each pressure vessel can be removed from the system for purposes of gas pressurization or decompression and then reattached. Therefore, the wheel or belt and pulley system can rotate continuously and is not affected by the time associated with pressurization and decompression. The system by which charged or decompressed pressure vessels are put into or taken out of the system in order that they may be charged or discharged will also contribute to the efficiency of the system.

In one embodiment, a pressure vessel is used that has an 80 cubic foot capacity at 3000 psi. For air, this pressure vessel has a pressurized weight that is about 5 to 6 pounds heavier that its decompressed state. For a pressure vessel holding about 130 cubic feet of pressurized air, the increase in weight is from about 9 or 10 pounds. In general, one cubic foot of air weighs 0.0807 lbs. at standard pressure and temperature (STP). Pressurizing approximately 80 cubic feet of air in pressure vessel, for example an aluminum tank, at 2400 psi yields a weight of approximately 6.4 pounds for the pressurized air in the pressure vessel. The same 80 cubic foot capacity pressure vessel produces a weight difference of about 8.2 pounds when the gas is Argon. For a pulley and belt system with a pre-determined height of 100 feet, 100 pressurized pressure vessels are placed along one side of the belt spaced apart by one foot. For a 5 pound pressurized weight differential in each pressure vessel, the amount of work is about 50,000 foot pounds. Increasing the height to 200 feet and the number of pressure vessels to 200 increases the work to about 200,000 foot pounds. An array of 10 identical wheels or pulleys along a common axis yields 10 times the work, or about 2,000,000 foot pounds of work.

Referring initially to FIG. 1, a compressed gas engine 100 in accordance with one exemplary embodiment of the present invention includes at least two pressure vessels 102 arranged as a diametrically opposed pair on each end of an arm 116. Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure vessel is sufficient to hold at least about 80 cubic feet of the gas at the pre-defined pressure. In another embodiment, each pressure vessel is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but at not limited to air, helium (He), neon (Ne), argon (Ar), krypton (Kr) and xenon (Xe). In one embodiment, the gas is the refrigerant R123, which has a specific gravity that is about 5.279 times greater than air.

The engine also includes at least one gas compressor 114 in communication with pressure inlet 104 of each the pressure vessel through pressure lines 108, preferably when each pressure vessel is located at the pre-determined height 120. Suitable pre-determined heights include at least 100 feet, at least 150 feet, at least 200 feet, at least 300 feet and at least 400 feet. The arm is sized to space the diametrically opposed pairs apart a distance corresponding to this pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 106 in communication with each pressure vessel, the pressure relief mechanism capable of returning the gas in each vessel to atmospheric pressure. Suitable pressure relief mechanisms include, but are not limited to, valves including pressure relief valves. In one embodiment, the pressure vessels rotate in the direction of arrow A about the central axis 118 of the arm between the pre-determined height and a bottom position. The central axis is in communication with gearing, arms and shafts, including cam shafts that translate the rotation of the arm and pressure vessels to the desired equipment including an electrical generator.

In one embodiment, the engine includes at least one pneumatic powered electric generator 110 in communication with the pressure relief mechanism 106 through the pressure lines 108. Suitable pneumatic powered electric generators are known and available in the art. In one embodiment, the engine includes a gas storage tank 112 in communication with the pressure relief mechanism and the gas compressor through the pressure lines 108. The gas storage tank holds the expanded depressurized gas at atmospheric pressure, for example, when the gas used is not air, e.g., argon. In one embodiment, active or passive heat exchangers are provided in communication with the pressure vessels to assist with the transfer of heat into and out of the system resulting from the compression and expansion of the gas in the pressure vessels. Suitable active and passive heat exchangers are known and available in the art.

Figure 2:
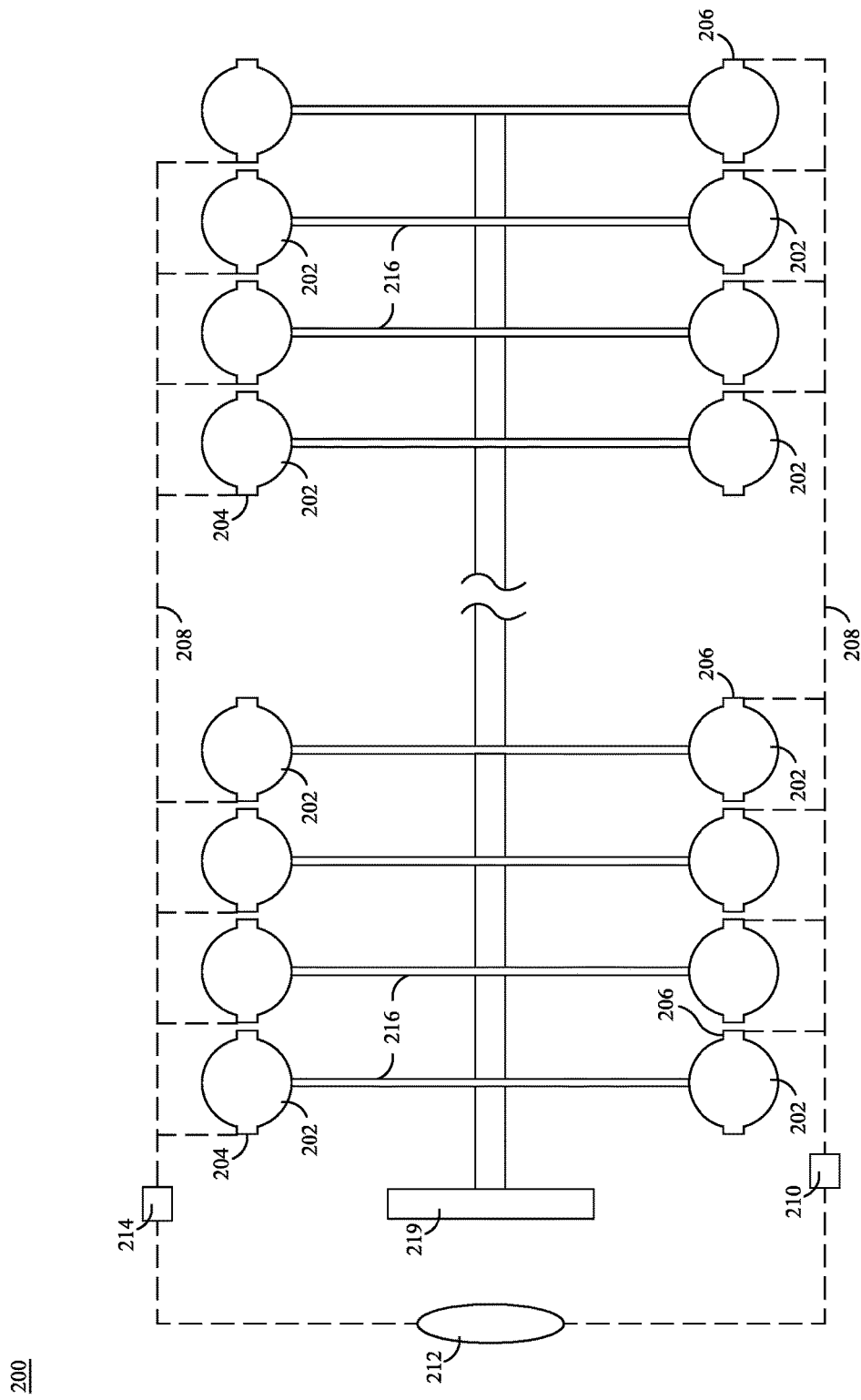
FIG. 2 is a view of another embodiment of the engine in accordance with the present invention.

Referring to FIG. 2, in another exemplary embodiment, the present invention is directed to an engine 200 having a plurality of pressure vessels 202 arranged in a plurality of diametrically opposed pairs. An arm 216 is attached to both pressure vessels in each diametrically opposed pair such that each pressure vessel in each diametrically opposed pair is disposed on either end of the arm. A rotatable shaft 217 is provided in contact with each arm at a point along the arm between the two pressure vessels. Each arm is shaped to engage the shaft to impart rotational motion from the arm to the shaft during at least a portion of each rotation of each arm around the shaft.

Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure vessel is sufficient to hold at least about 80 cubic feet of the gas at the pre-defined pressure. In another embodiment, each pressure vessel is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but are not limited to air, helium (He), neon (Ne), argon (Ar), krypton (Kr), xenon (Xe) and various refrigerant gases.

The engine also includes at least one gas compressor 214 in communication with the pressure inlet 204 of each pressure vessel through the pressure lines 208, preferably when each pressure vessel is located at the pre-determined height. Suitable pre-determined heights include at least 100 feet, at least 150 feet, at least 200 feet, at least 300 feet and at least 400 feet. The arm is sized to space the diametrically opposed pairs apart a distance corresponding to this pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 206 in communication with each pressure vessel, the pressure relief mechanism capable of returning the gas in each vessel to atmospheric pressure. Suitable pressure relief mechanisms include, but are not limited to, valves including pressure relief valves. In one embodiment, the engine includes at least one pneumatic powered electric generator 210 in communication with the pressure relief mechanism 206 through the pressure lines 208. Suitable pneumatic powered electric generators are known and available in the art. In one embodiment, the engine includes a gas storage tank 212 in communication with the pressure relief mechanism and the gas compressor through the pressure lines 208. The gas storage tank holds the expanded depressurized gas at atmospheric pressure, for example, when the gas used is not air, e.g., argon. In one embodiment, active or passive heat exchangers are provided in communication with the pressure vessels to assist with the transfer of heat into and out of the system resulting from the compression and expansion of the gas in the pressure vessels. Suitable active and passive heat exchangers are known and available in the art.

In one embodiment, the plurality of diametrically opposing pairs of pressure vessels is arranged as a plurality of opposed pairs of pressure vessels spaced along the length of a common rotating shaft 217. In one embodiment, the plurality of paired pressure vessels forms a circular arrangement of pressure vessels that is a coplanar arrangement aligned in a vertical plane and having a central hub around which all the pressure vessels in the circle rotate. For a given diametrically opposed pair of pressure vessels, each pressure vessel in that pair oscillates or alternates between an uppermost position and a lowermost position. When in substantially the lowermost position, the gas in a given pressure vessel is decompressed, and when in the uppermost position, the gas in a given pressure vessel is compressed.

As illustrated, the common rotatable shaft 217 has a given length, and the plurality of pressure vessels associated in pairs is spaced along this length of rotatable shaft. Each pair of pressure vessels is in communication with the shaft and can rotate about the shaft in a distinct plane that is substantially perpendicular to the shaft. Preferably, each pair of pressure vessels rotates in a separate plane, and all of the planes are substantially parallel to one another. The pressure vessel pairs are in communication with the shaft such that as the pairs rotate about the shaft, the rotational motion or momentum from the pressure vessels is imparted to the shaft as rotational motion. Preferably, each pair of pressure vessels rotates about the shaft independently of the other pairs of pressure vessels. Therefore, the different pairs can rotate simultaneously and at different speeds. In one embodiment, the rotating shaft 217 is in communication with a flywheel 219. The shaft imparts rotational movement to the flywheel when the shaft is spinning faster than the flywheel. Suitable arrangements of flywheels are known and available in the art. The flywheel maintains this rotational motion, which is communicated to one or more devices either directly or through an arrangement of gears and transmissions. Alternatively, the rotating shaft is directly connected to a device for harnessing the rotational motion of the shaft. In another embodiment, the engine includes a transmission that is in communication with the shaft and that is capable of modifying at least one of a rotational speed and a torque received from the shaft. These devices convert the rotational motion into the desired electrical work, e.g., producing an electrical current or charging batteries, or mechanical work.

As the pairs are spaced along the shaft, the engine forms an array of paired, rotating pressure vessels. The length and size of the array can be varied depending upon the engine application. A single array or banks of multiple arrays can be used in a given installation.

In one embodiment, each pair of pressure vessels in the engine includes the connecting arm 216 attached to both pressure vessels in the pair such that each pressure vessel in the pair is disposed on either end of the arm. Therefore, the engine includes a plurality of arms 216, one each for the plurality of pressure vessel pairs, and each arm is in rotatable contact with the shaft 217 at a point along the arm 216 between the two pressure vessels. In order to impart rotational motion to the shaft, the arm is arranged to engage the shaft as the arm rotates about the shaft. In one embodiment, the arm is fixed to the shaft, and both the arm and the shaft rotate together during an entire rotation. In another embodiment, the arm engages the shaft only during a portion of the rotation. At other points in the rotation, the arm rotates around or spins free of the shaft. In one embodiment, each arm further includes a first part of a two-part ratchet connection, and the shaft includes corresponding second parts of the two-part ratchet connection, one second part for each arm in communication with the shaft.

Figure 3:
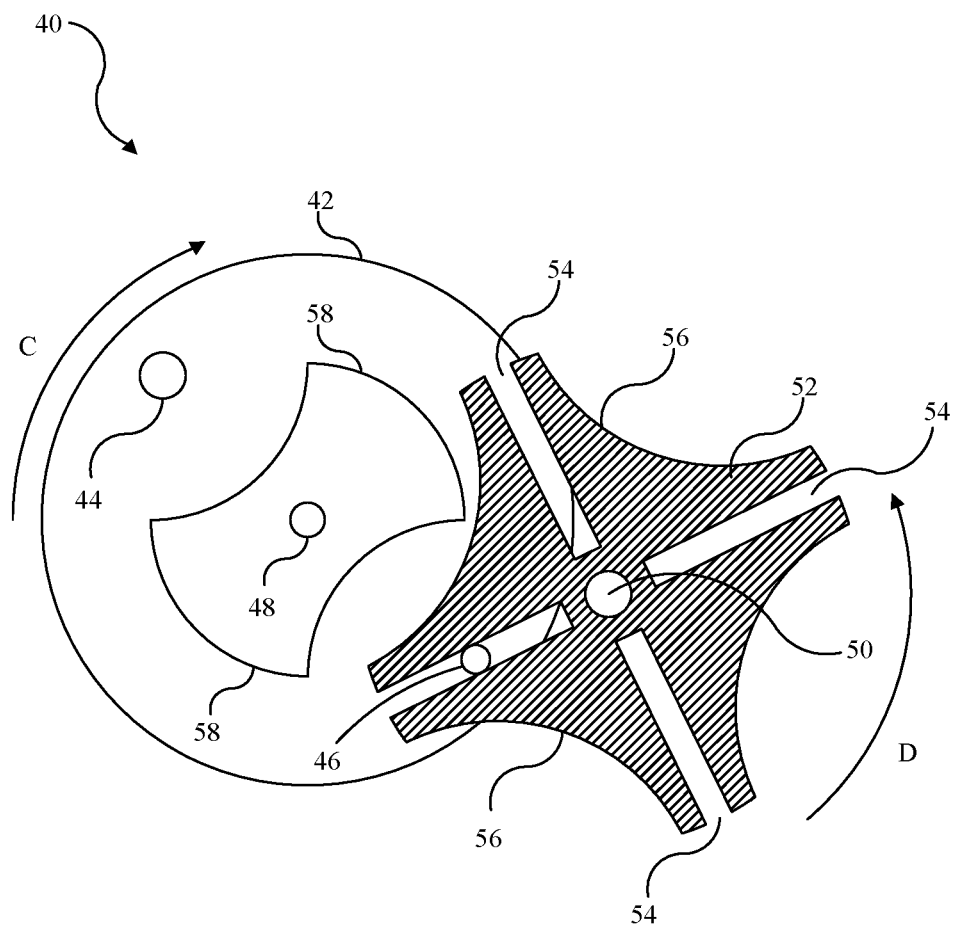
FIG. 3 is a view of an embodiment of a connection mechanism between an arm and a shaft about which the arm rotates.

In order to provide rotational engagement between the arm and the shaft, each arm includes a first part of a two-part rotating connection, and the shaft includes a corresponding second part of the two-part rotating connection in contact with the first part. Referring to FIG. 3, an exemplary embodiment of a two-part connection 40 between the connecting arm and the rotating shaft is illustrated. In accordance with this embodiment, the connecting arm includes or is connected to a first rotating connection part 42 that rotates about a first axis 48. The first rotating connection part includes a first post 44 and a second post 46 extending from the surface. The rotating shaft includes or is connected to a second rotating connection part 52 that rotates about a second axis 50. The first axis 48 is parallel to but spaced from the second axis 50. As the first rotating connection part 42 rotates in the direction of arrow C, the second rotating connection part is not rotating, and one of the first and second posts enters one of a plurality of radial slots 54 disposed in the second rotating connection part. The post travels into the slot and engages one of the sides or bottom of the slot, causing the second rotating connection part to rotate in the direction of arrow D. Since the second rotating connection part is attached to the rotating shaft, rotation of the second rotation connection part rotates the shaft. The second rotating connection part continues to rotate until the slot is positioned such that the post passes out of the slot. The second rotating connection part then stops rotating, and the first rotating connection part can continue to rotate. In one embodiment, the posts are positioned about the first rotating connection so that engagement of the posts in the slots corresponds to movement of the uppermost pressure vessel from the 3 o'clock position to the 6 o'clock position. The second rotating connection part can include a plurality of concave surfaces 56 that correspond to convex surfaces 58 on the first rotating connection. This arrangement permits relative rotation between a rotating first connection part and a stationary second connection part. The first and second connections can be in direct contact with the connecting arm and rotating shaft or are connected through one or more gears, arms or clutch mechanisms. Permitting free fall during a portion of the rotation provides for the capture of as much energy as possible as the uppermost pressure vessel moves into the lowermost position under the force of gravity.

In another embodiment, a controllable pneumatic engagement system is used. In this embodiment, a pneumatic or air driven post disposed in the rotating shaft moves outward, for example radially, from the shaft and engages a corresponding hole in the arm. Once engaged, the arm and shaft rotate together. The post would be controlled to engage the arm in the 3 o'clock position and disengage the arm in the 6 o'clock position. Other pneumatic embodiments would use a friction system, for example as found in air brakes, to engage the rotating shaft and the arm selectively.

Since each one of the plurality of pairs preferably rotates about the shaft independent of the rotation of the other pairs, in one embodiment, the engine includes a control mechanism (not shown) for synchronizing or timing the rotation of the pairs of pressure vessels about the shaft. In particular, the control mechanism prevents or inhibits a pressure vessel in the uppermost position and having a sufficient amount of weight from moving or rotating to the lowermost position. Suitable control mechanisms include, but are not limited to, electromagnets mounted on the pressure vessel or along the length of each connecting arm, mechanical holders that grasp each arm and can be controlled to release the arm and braking systems that are mounted along the shaft for example in the connection between the shaft and each arm. The control mechanism also includes a logic control unit to control the release of each pair of pressure vessels in response to one or more predefined conditions such as the expiration of a given period of time or the rotational speed of the shaft or flywheel. Suitable control mechanisms and components are known and available in the art.

Therefore, the plurality of pressure vessel pairs forms a timed array in combination with the shaft. In one embodiment, where the planes in which each pair of pressure vessels rotates are substantially vertical, and the pressure vessels can oscillate between an uppermost position and a lowermost position, such that when moving from the uppermost position to the lower most position, each pressure vessel is capable of free falling at least a portion of the distance between the uppermost position and the lowermost position, the control mechanism times when a given pressure vessel can begin a free fall from its uppermost position to its lowermost position. In one embodiment, sensors are used to determine when a given pressure vessel in the uppermost position is sufficiently full of compressed gas. The full pressure vessel can then be released based upon time or the rotational speed of the rotatable shaft or flywheel. In one embodiment, the logic control unit uses algorithms that use the temperature of the ambient air as a variable for determining how fast the upper pressure vessel will be pressurized and that calculate the maximum energy recapture based on the availability of pressurized pressure vessels in the uppermost position and the release intervals of the available pressure vessels. The control unit can also control mechanisms that remove individual pressure vessels from the wheel or belt or replace individual pressure vessels from the wheel or belt in order to provide sufficient time for pressurization and depressurization without inhibiting the continuous or regular rotation of the wheel or belt.

Figure 4:
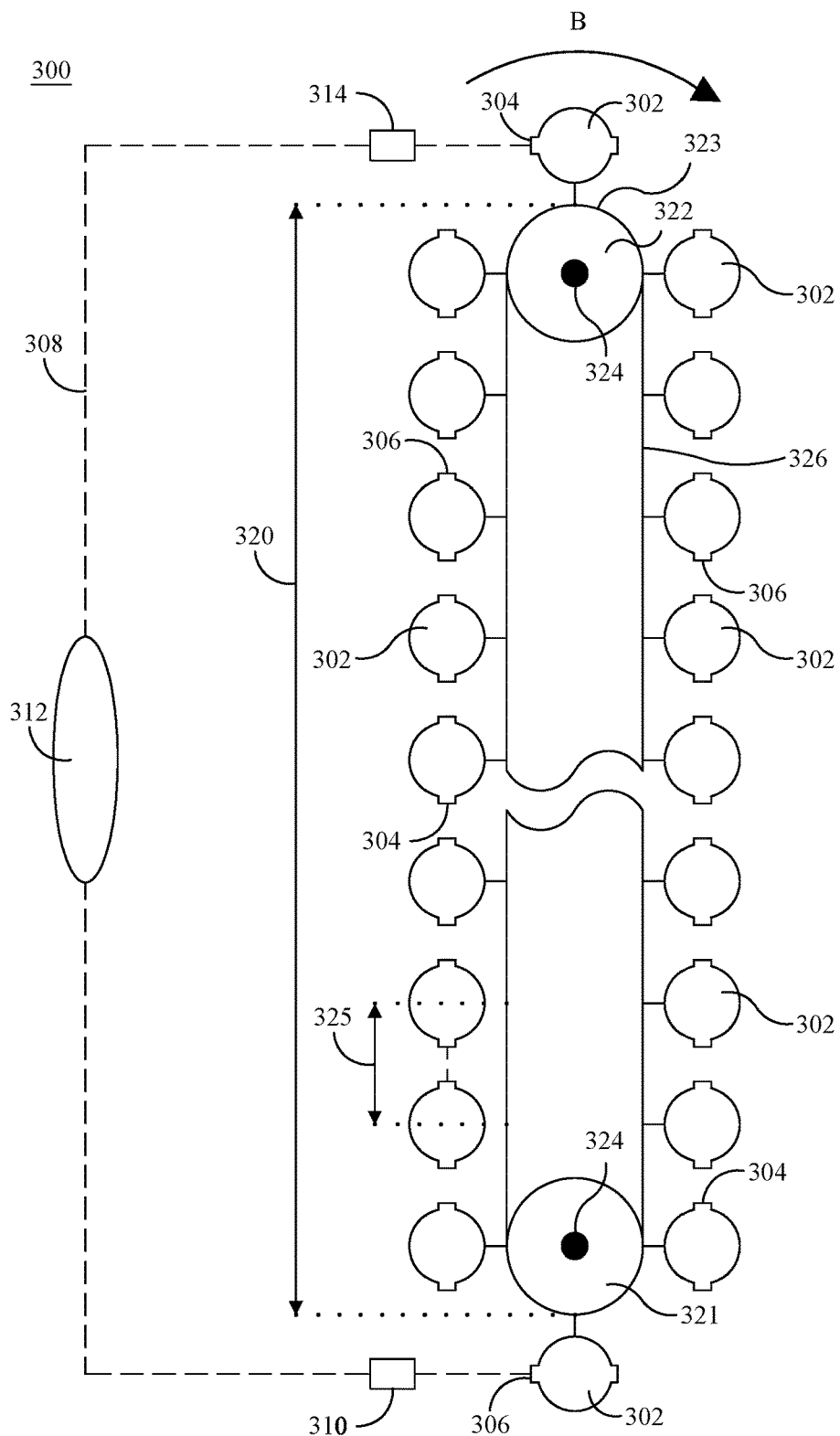
FIG. 4 is a schematic representation of an embodiment of an engine containing a pulley and belt drive mechanism.

Referring to FIG. 4, in another exemplary embodiment, the present invention is directed to an engine 300 that includes a continuous vertical conveyor 323 having a pre-determined height 320. The engine includes a plurality of pressure vessels 302 connected to the continuous vertical conveyor for transport by the continuous vertical conveyor to and from the pre-determined height. In one embodiment, each pressure vessel is a spherical pressure vessel. Each spherical pressure vessel can be configured as a hollow sphere constructed from two or more pieces welded together. In one embodiment, each spherical pressure vessel is formed from two semi-spherical halves joined together along a seam. In one embodiment, the seam is a welded seam. Preferably, the seam is a flanged seam, and the two semi-spherical halves are secured together using a plurality of fasteners, for example, a plurality of bolts or screws. In one embodiment, each pressure vessel is releasably connected to the vertical conveyor. In one embodiment, each pressure vessel is connected to the vertical conveyor using an attachment mechanism that allows the pressure vessel to pivot or rotate to maintain a given vertical orientation.

Each pressure vessel has an operating pressure sufficient to hold gas at a pre-defined pressure. In one embodiment, the pre-defined pressure is at least about 2000 psi. In another embodiment, the pre-defined pressure is at least about 3000 psi. In one embodiment, each pressure is sufficient to hold at least about 80 cubic feet of the gas at the pre-defined pressure. In another embodiment, each pressure is sufficient to hold at least about 100 cubic feet of the gas at the pre-defined pressure. In one embodiment, the gas at the pre-defined pressure comprises a weight of at least about 3 pounds, preferably at least about 5 pounds, more preferably at least about 10 pounds. Suitable gases include, but are not limited to air, helium (He), neon (Ne), argon (Ar), krypton (Kr), xenon (Xe) and any of a number of refrigerant gases.

The engine also includes at least one gas compressor 314 in communication with a pressure inlet 304 of each pressure vessel through pressure lines 308, preferably when each pressure vessel is located at the pre-determined height 320. Suitable pre-determined heights include at least 100 feet, at least 150 feet, at least 200 feet, at least 300 feet and at least 400 feet. The vertical conveyor is sized or has a length sufficient to convey the pressure vessels to and from the pre-determined height. Suitable gas compressors include electrical gas compressors, including energy efficient or low power gas compressors and are known and available in the art. The gas compressor is capable of compressing a gas in each pressure vessel to the pre-defined pressure. The engine can include a single gas compressor that engages the pressure inlet of each pressure vessel when that pressure vessel reaches the pre-determined height. Alternatively, the gas compressor is mounted on the arm, for example at the central axis, and is in communication with each pressure vessel. In one embodiment, a separate gas compressor is mounted on each pressure vessel.

The engine also includes a pressure relief mechanism 306 in communication with each pressure vessel, the pressure relief mechanism capable of returning the gas in each vessel to atmospheric pressure. Suitable pressure relief mechanisms include, but are not limited to, valves including pressure relief valves. In one embodiment, the engine includes at least one pneumatic powered electric generator 310 in communication with the pressure relief mechanism 306 through the pressure lines 308. Suitable pneumatic powered electric generators are known and available in the art. In one embodiment, the engine includes a gas storage tank 312 in communication with the pressure relief mechanism and the gas compressor through the pressure lines 308. The gas storage tank holds the expanded depressurized gas at atmospheric pressure, for example, when the gas used is not air, e.g., argon. In one embodiment, active or passive heat exchangers are provided in communication with the pressure vessels to assist with the transfer of heat into and out of the system resulting from the compression and expansion of the gas in the pressure vessels. Suitable active and passive heat exchangers are known and available in the art.

In one embodiment, the continuous vertical conveyor includes a first rotatable wheel 321 and a second rotatable wheel 322 disposed vertically above the first rotatable wheel. A belt 326 or chain is disposed around the first rotatable wheel and the second rotatable wheel. The rotation of the belt about the first rotatable wheel and the second rotatable wheel, for example in the direction of arrow B, moves any given point along the belt to and from the pre-determined height. In one embodiment, the bearing surfaces of the first rotatable wheel and the second rotatable wheel utilize magnetic bearings to decrease friction and frictional losses. Suitable magnetic bearings include both passive magnetic bearings and active magnetic bearings. The active magnetic bearings can utilize any source of electricity or electrical current generated, for example, by the engine, pneumatic generators and reciprocating electrical generators described herein. Magnetic bearings can be used in any bearing surface of the embodiments described herein.

The plurality of pressure vessels 302 are attached to the continuous vertical conveyor or the belt of the continuous vertical conveyor at a plurality of distinct points along the continuous vertical conveyor. In one embodiment, each pair of adjacent distinct points in the plurality of distinct points are spaced apart by a distance 325 of at least about one foot along the belt. In an embodiment where each pressure vessel is a spherical vessel having a diameter of up to about 6 feet, the distance is at least about 7 feet. Alternatively, the pressure vessels are spaced from each other by the distance. As the pressure vessels are pressurized at the pre-determined height, the additional weight pulls the pressure vessels downward, rotating the belt and the first and second rotatable wheels or pulleys. This rotates the central shafts 324 of the rotatable wheels. These central shafts are placed in contact with the shafts, gears or transmissions from which usable work can be derived. In one embodiment, an electrical generator is in communication with at least one of the first rotatable wheel and the second rotatable wheel.

Figure 5:
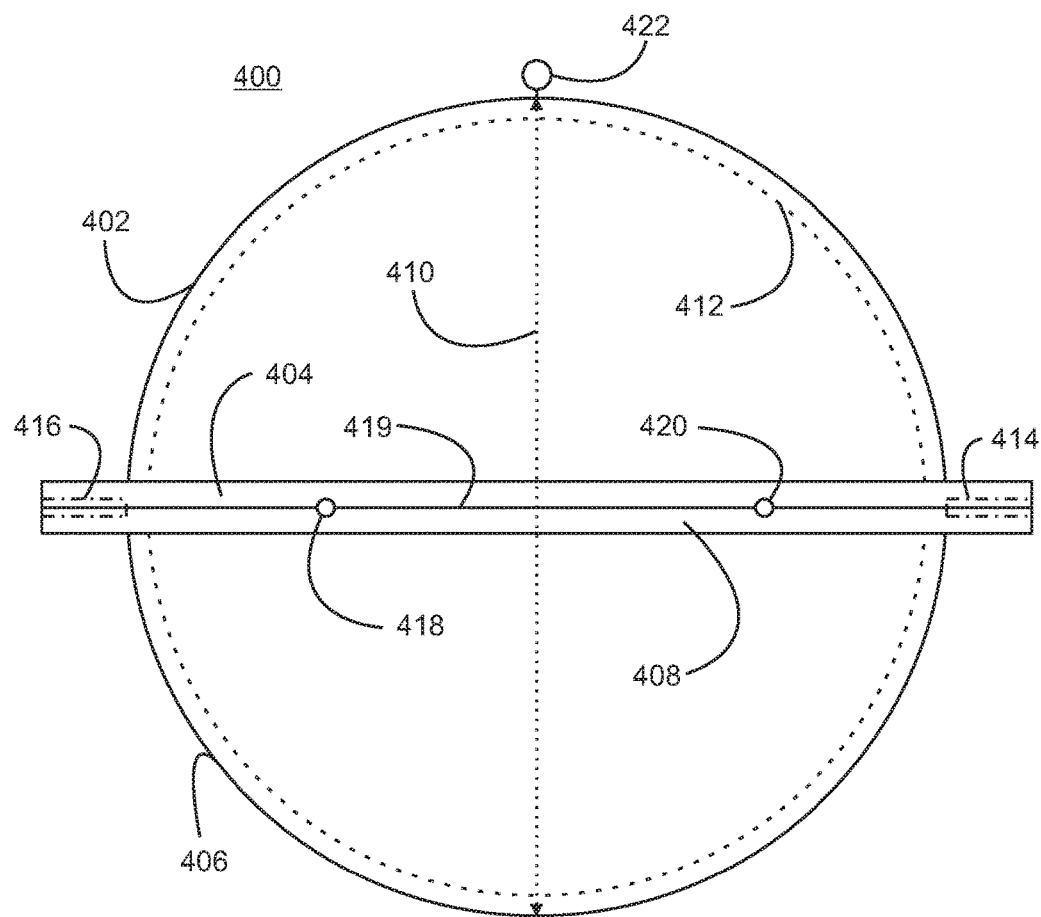
FIG. 5 is a schematic representation of an embodiment of a spherical pressure vessel.

Referring to FIG. 5, an embodiment of a spherical pressure vessel 400 is illustrated. The spherical pressure vessel includes a first hemispheric portion 402 with a first flange 404 and a second hemispherical portion 406 with a second flange 408. Suitable materials for the hemispherical portions and flanges include metals, for example, aluminum. The first flange is aligned with and in contact with the second flange to form the spherical pressure vessel. In one embodiment, the first flange is welded to the second flange. In one embodiment, the first flange is attached to the second flange using a plurality of fasteners, for example, screws or bolts to create the spherical pressure vessel. In one embodiment, a gasket is provided between the first flange and second flange. In one embodiment, the first hemispherical portion and the second hemispherical portion include an internal structural liner 412. The internal structural liner provides increased rigidity and strength to the pressure vessel while reducing the thickness and weight of the pressure vessel. Suitable materials for the internal structural liner include, but are not limited to, carbon fiber.

The spherical pressure vessel has a diameter 410. Suitable diameters are up to about 6 feet. When attached to the continuous vertical conveyor, the first hemispherical portion is aligned vertically above the second hemispherical portion. Preferably, this vertical orientation between the hemispherical portions is maintained through all positions of the pressure vessel along the continuous vertical conveyor, i.e., at all locations around the continuous vertical conveyor. In addition, the vertical orientation is maintained when the pressure vessel is removed for pressurization or de-pressurization. In one embodiment, the pressure vessel includes a mount 422, for example, an eyelet or loop, attached to the top of the first hemispherical portion. This mount engages, for example, a hook associated with and moveable along, the continuous vertical conveyor. Therefore, the pressure vessel hangs from the hook in the vertical orientation. Other attachment arrangements can also be used that include, for example, swivels and joints to maintain the desired vertical orientation. In one embodiment, the pressure vessel includes ballast, for example, in the second hemispherical portion, to bias the pressure vessel in the vertical orientation. In one embodiment, the spherical pressure vessel is placed in or mounted to a gimbal frame to maintained the vertical alignment. Suitable arrangements of gimbal frames are known and available in the art. In one embodiment, the spherical pressure vessel is mounted in the gimbal frame, and the gimbal frame is releasably attached to the continuous vertical conveyor. In another embodiment, the gimbal frame is mounted to the continuous vertical conveyor and the spherical pressure vessel is placed into and removed from the gimbal frame.

To access the interior volume of the spherical pressure vessel to pressurize or depressurize the spherical pressure vessel or to provide wiring access and plumbing access to the interior volume of the spherical pressure vessel, a plurality of holes or ports are provided passing through the walls of the spherical pressure vessel. These ports can be located in rounded portions of at least one of the first hemispherical portion and the second hemispherical portion. Alternatively, the ports are disposed in at least one of the first flange and the second flange. In one embodiment, the ports are disposed in and extend through the first and second flanges. In one embodiment, the ports pass through the flange and are centered on a joint line 419 between the first flange and the second flange. Therefore, each port is an indentation formed from opposing grooves extending through the first and second flanges. Each port can be a smooth bore or a threaded bore. Suitable ports include a first wire port 416, a second wire port 414, a pressure inlet port 420 and a pressure relief port 418, which can accommodate pressure relief valves and pressure relief mechanisms. The electrical leads of the first and second reciprocating electrical generators are routed through at least one of the first and second wire ports. Ports can also be provided for refrigerant lines and pressure lines. Suitable cross-sections for the portions include circular cross sections. In one embodiment, each port is lined with material such as carbon fiber and elastomers to maintained a pressurize seal for the pressure vessel.

In one embodiment, additional energy is recaptured from the changes in temperature associated with pressurizing and depressurizing the pressure vessels and in particular the spherical pressure vessels. For example, the changes in heat within each pressure vessel are converted into electricity or electric current, and the generated electricity or electric current can be returned to the compressed gas engine to contribute power to systems including heat exchanges and gas compressors. In one embodiment, at least one reciprocating electrical generator is included in each spherical pressure vessel. In another embodiment, a plurality of reciprocating electrical generators is disposed within each pressure vessel. In one embodiment, a pair of reciprocating electrical generators is included in each spherical pressure vessel. Suitable reciprocating electrical generators are described in U.S. Pat. Nos. 7,694,515, 8,539,765 and 8,633,604, the entire contents of which are incorporated herein by reference. Each reciprocating electrical generator converts heat generated during pressurization of the spherical pressure vessel into electric current.

Figure 6:
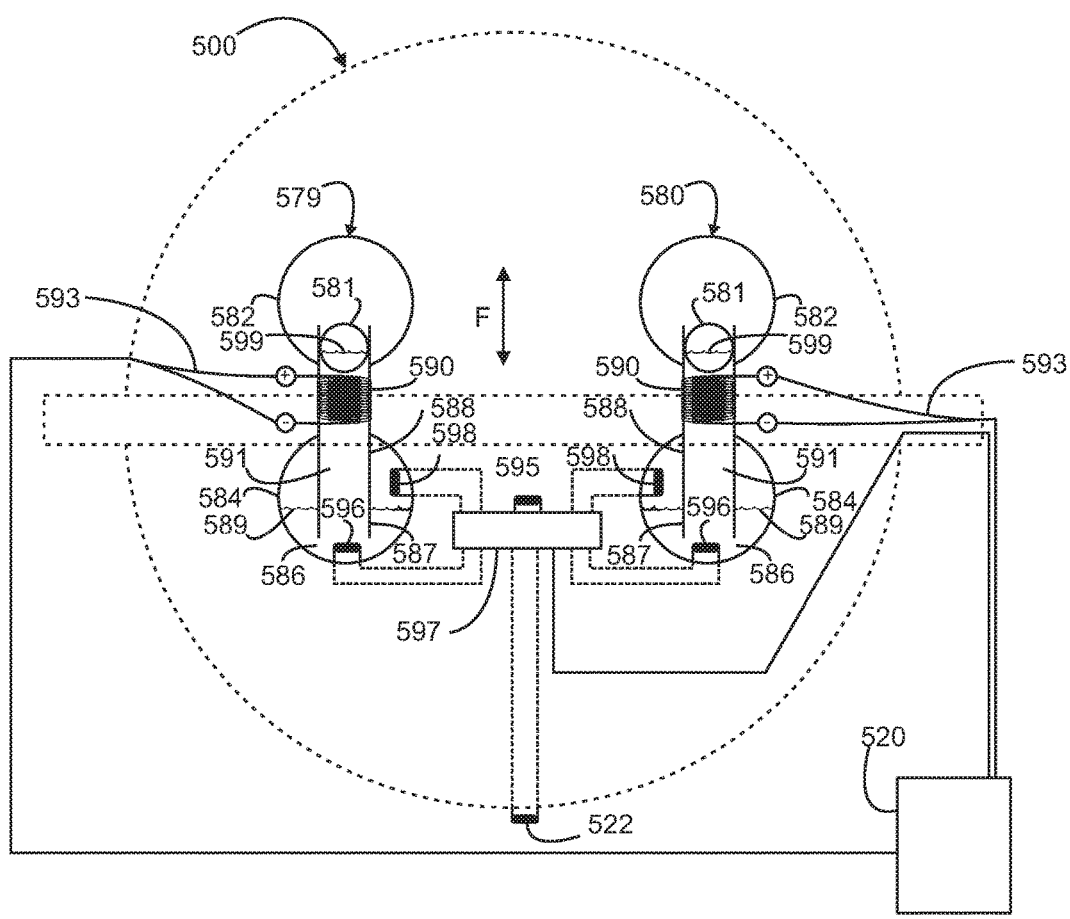
FIG. 6 is a schematic representation of an embodiment of spherical pressure vessel containing a pair of reciprocating electrical generators.

Referring now to FIG. 6, an embodiment of a spherical pressure vessel 500 containing a pair of the reciprocating electrical generators, a first reciprocating electrical generator 579 and a second reciprocating electrical generator 580, is illustrated. The first and second reciprocating electrical generators are mounted within the first and second hemispherical portions before the first and second hemispherical sections are combined to form the spherical pressure vessel. In one embodiment, framing and supports are provided to position and hold the first and second reciprocating electrical generators at a desired position within the spherical pressure vessel. All of the components of the first and second reciprocating electrical generators are configured to withstand the pressures and temperatures within the spherical pressure vessel.

Each reciprocating electrical generator includes a first bottom container 584 located in a bottom or lowermost position and a second top container 582 located in a top or uppermost position. The first and second containers are fixedly secured together and brought into fluid contact through a connecting arm 588 that includes a central tube or hollow bore 591. A float 581, for example, a buoyant spherical magnet, is disposed within the connecting arm. In one embodiment, the top container is larger in volume than the lower container to minimize compression backpressure. Preferably, the top container has a volume sufficient to permit expansion of the gas phase of the low boiling point liquid 586 that is disposed within the first lower container. A sufficient amount of low boiling point liquid is disposed in the first container such that the open end 587 of the connecting arm that is disposed in the first container is always located below the surface level 589 of the low boiling point liquid in the first container 584. Therefore, during all cycles of the each reciprocating electrical engine, the open end of the connecting arm is below the surface of the low boiling point liquid.

The float or buoyant spherical magnet 581 is located within the central bore 591 of the connecting arm 588 and is buoyant in the low boiling point liquid. In one embodiment, the spherical magnet 581 includes a buoyant material that is compatible with the low-boiling point liquid. Alternatively, the spherical magnet 581 is a hollow sphere. In one embodiment, the spherical magnet has a polarity that is aligned about the equator of the sphere. Therefore, the top of the sphere is one pole, and the bottom of the sphere is the opposite pole. Preferably, the spherical magnet is constructed to provide a uniform polarity across the entire surface of the sphere. Therefore, the entire outer surface of the sphere is a first pole, and the entire inner surface of the sphere is a second pole that is magnetically opposite the first pole.

Figure 7:
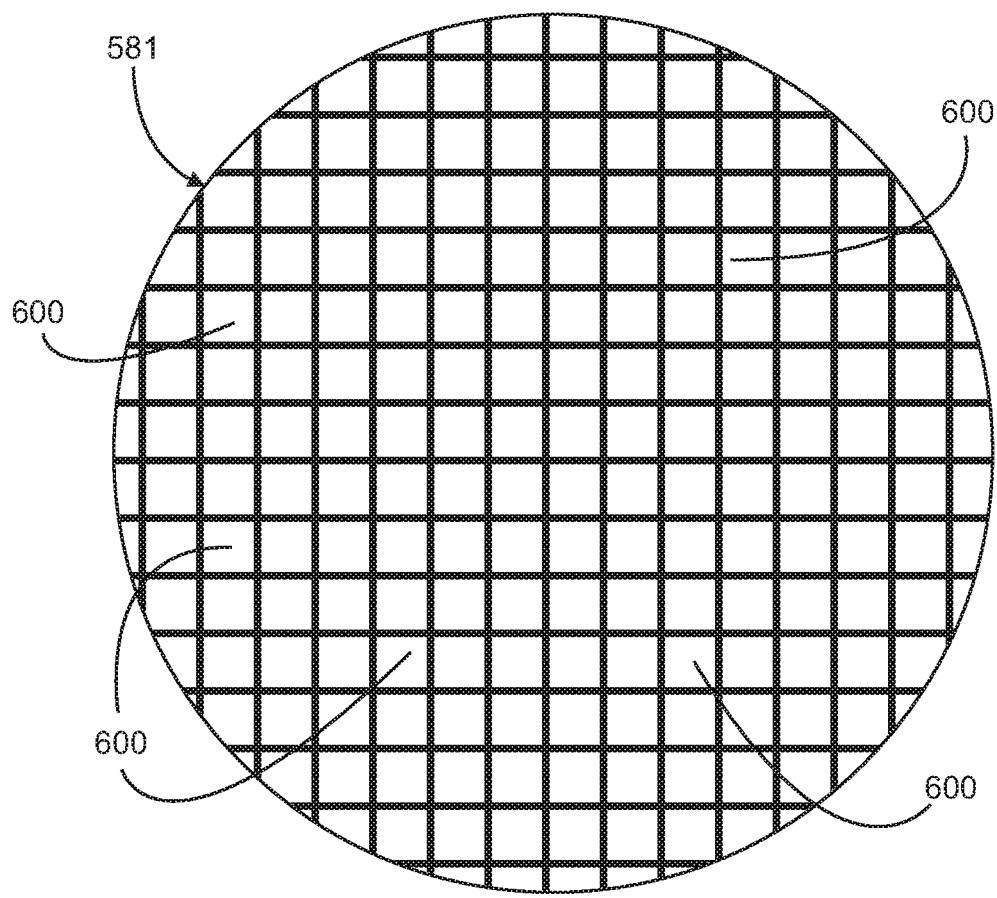
FIG. 7 is a schematic representation of an embodiment of a spherical magnet for use in a reciprocating electrical generator.
Figure 8:
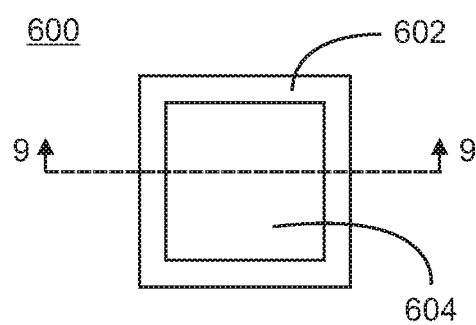
FIG. 8 is a schematic representation of an embodiment of an individual plate magnet for use in the spherical magnet of FIG. 7.
Figure 9:
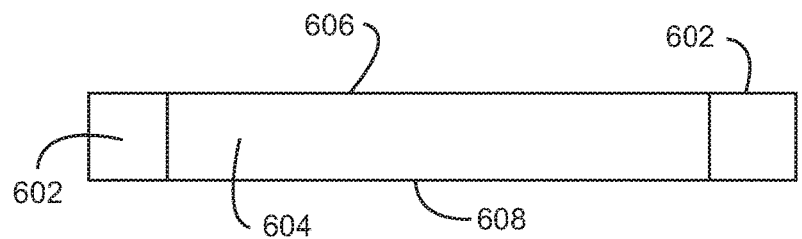
FIG. 9 is a view through line 9-9 of FIG. 8.

Referring to FIG. 7-9, an embodiment of a buoyant hollow spherical magnet 581 is illustrated. Although illustrated as a hollow spherical magnet, other suitable shapes can be used for the hollow magnet including a hollow elliptical magnet, a hollow cylindrical magnet and a hollow conical magnet. All of the disclosure pertaining to the hollow spherical magnet is applicable to other magnet geometries.

As illustrated, the hollow spherical magnet is constructed from a plurality of individual magnets 600 that are arranged to form the outer layer of the sphere. In one embodiment, each individual magnet is shaped like a wedge having an outer surface with a curvature suitable for the surface of the sphere. These individual wedge pieces fit together to form the sphere. Preferably, each individual magnet 600 is a flat or plate magnet that is shaped to a curvature suitable for the surface of the sphere. Each individual magnet 600 represents a generally rectangular or square section of the surface of the sphere, and the individual rectangles are three-dimensional rectangular plates that are placed together with their sides touching. The individual magnets 600 are placed together so that the outer layer of the sphere forms a fluid tight surface. Suitable methods for joining the magnets together include using adhesives such as glues or epoxies. The size of the individual magnets 600 can be varied as desired. In addition, the total number of magnets in the spherical magnet can be varied from 2 or 4 magnets to larger numbers of magnets.

Two or more of the individual magnets can be arranged on the surface of the sphere so that the sides that are touching are edges of the actual plate magnets. Therefore, groupings of individual magnets along the surface of the sphere form larger magnets that constitute a spherical section. Preferably, a separate non-magnet material is provided between adjacent edges of some of or all of the edges of the individual magnets. For example, the non-magnetic material can be provided between edges so that two lines of non-magnetic material are provided that divide the sphere into for equal areas, each area having at least one and preferably a grouping of individual magnets. Additional non-magnetic material between the edges can be provided until all of the edges between adjacent individual magnets are spaced apart by non-magnet material. Even though non-magnet material is used, the surface of the sphere remains fluid tight. The center of the sphere is hollow or may contain a buoyant material such as wood or polystyrene.

In one embodiment as is shown in FIG. 8, each individual magnet 600 includes a central magnet portion 604 and an outer portion 602. The outer portion extends around all of the edges of the central magnet portion and is preferably of a uniform thickness. As shown in FIG. 9, each central magnet portion has a first face 606 with a first magnetic polarity and a second face 608 opposite the first surface and having a second opposite magnetic polarity. Therefore, each individual magnet is arranged with its first face on the outer surface of the sphere and its second surface on the inner surface of the sphere. The polarities are configured and arranged so that the entire outer surface of the spherical surface presents a single pole and the internal spherical surface present the opposite magnetic pole. Alternatively, the individual magnets of the spherical magnet can be arranged so that a vertical polarity is achieved on the surface of the sphere creating a columnar or buoy configuration or buoy-like configuration.

The outer portion 602 is formed from an insulating or dielectric material. The width of the outer portion is selected so that adjacent individual magnets are spaced sufficiently apart so that the magnetic field lines of adjacent magnets do not adversely interfere. In one embodiment, the outer surface of the sphere is coated with a lubricating or friction reducing coating, for example a thin polymer of tetrafluoroethylene fluorocarbon (polytetrafluoroethylene [PTFE]), which is commercially available under the tradename Teflon® from E. I. du Pont de Nemours and Company of Wilmington, Del., to minimize the friction of the sphere as it moves through the bore of the connecting arm.

In one embodiment, the diameter of the spherical magnet is selected to provide a sufficiently tight fit with the bore of the connecting arm to minimize unwanted lateral movement of the sphere while avoiding undesired drag on the bore. Returning to FIG. 6, for each reciprocating electrical generator, a wire coil 590 is wound around the exterior of the connecting arm 588 between the first and second containers. Suitable wire for the wire coil includes copper wire. Electrical leads or connections 593 are disposed on either end of the wire coil. The electrical leads are routed out of the spherical pressure vessel. The electrical leads can be routed through one of the hemispherical portions, as illustrated for the first reciprocating electrical generator, or through the flange portion, as illustrated for the second reciprocating electrical generator. In one embodiment, the electrical leads from both reciprocating electrical generators are combined and routed out of the spherical pressure vessel. In one embodiment, the electrical leads are routed to a control module that can include, for example, batteries for storing the generated power and a logic controller for providing the generated and stored power to other loads such as heat exchangers, compressors and motors. In one embodiment, the electrical leads are routed to at least one of the compressors and heat exchangers located inside or outside the spherical pressure vessel.

A first heat exchanger portion 596 of an active heat exchanger is disposed within each first container 584 in contact with the low-boiling point liquid 586. A second heat exchanger portion 598 is also disposed in each first container 584 in the space above the liquid. The first and second heat exchanger portions are in contact with a controller portion 597 that contains pumps, valves and electronics to control the operation of the active heat exchanger. In one embodiment, the controller portion is in communication with the control module 520 to receive at least one of power and control instructions from the control module. At least one additional internal heat exchanger portion 595 is provided within the spherical pressure vessel, in the internal ambient environment, and is in contact with the controller portion. At least one additional external heat exchanger portion 522 is provided outside the spherical pressure vessel, in the external ambient environment, and is in contact with the controller portion.

The heat exchanger portions provide for the transfer of heat among the first bottom containers of the first and second reciprocating electrical generators, the internal ambient environment within the spherical pressure vessel and the external ambient environment outside the spherical pressure vessel. The operation of the active heat exchanger is the same as the active heat exchangers discussed above, and the active heat exchanger transfers heat into and out of the first containers. In addition, the first and second heat exchanger portions are used to transfer heat between the first containers of the first reciprocating electrical generator and the second reciprocating electrical generator. The selective transfer of heat among the various containers and environments is used to create the desired reciprocal motion in the reciprocating electrical generators to generate the electrical power. In one embodiment, temperature sensors are provided in one or more of the first containers of the first and second reciprocating electrical generators, the ambient environment within the spherical pressure vessel and the ambient environment outside the spherical pressure vessel in order to determine the desired direction of heat transfer to achieve reciprocal motion of the float or buoyant spherical magnet 581 in the first and second reciprocating electrical generators.

The first and second reciprocating electrical generators 579, 580 utilize the active heat exchanger to extract heat from the ambient environments and to transfer heat between the first containers. The active heat exchanger, for example a heat pump, consumes one unit of electrical energy to transfer 3, 4 or 5 units of heat energy. The inputted energy in the form of heat is introduced into one of the first containers through at least one of the first and second heat exchanger portions or removed from one of the first containers through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as a compression chamber. The rising level of liquid in the tube 599 floats or pushes the spherical magnet 581 through the tube and through the wire windings.

The first container is then cooled through the use of at least one of the first and second heat exchanger portions. In one embodiment, the heat removed from one first container by cooling is transferred to the other first container. When the first container is cooled, for example by a few degrees, the vapor pressure above the liquid in the first container will decrease. The level of fluid in the tube will fall down through the connecting arm, and the spherical magnet will also fall back through the tube and the wire windings. This process of heating and cooling is continued, and the magnet oscillates up and down through the tube and wire windings in the direction as indicated by arrow F. The vertical oscillation of a fixed magnet through the wire coil induces a current in the windings that is communicated to the electrical leads and the loads attached to those electrical leads. In one embodiment, the first and second containers and tube of each reciprocating electrical generator are sufficiently insulated to prevent transfer of heat directly between the internal ambient environment of the spherical pressure vessel.

In one embodiment, oscillation of the magnet, including the spherical magnet is enhanced by providing a biasing member between the magnet and the first container 584. This biasing member biases the magnet downwards into the first container and assists in the downward movement of the magnet when the level of the fluid in the connecting arm drops. At the top of the cycle when the magnet is at its top most position, heat is removed from the system, and the meniscus between the gas and liquid phase of the working fluid in the connecting arm descends. The decent of the working fluid can be faster than the decent of the magnet. The biasing member provides additional force to bring the magnet through the coil at a faster rate.

Suitable biasing members include springs that are attached between the magnet and the first container, weights attached to the magnet and expandable or deformable bladders or baffles that create back-pressure on the magnet and low boiling point working fluid. In one embodiment, the spring constant of the biasing spring is chosen so as not to interfere with the upward motion of the floating magnet. Preferably, the biasing member is a ballast drag element that has a specific gravity that is very close to or substantially the same as the working fluid. Therefore, the ballast drag element when attached to the magnet would not add appreciable weight to the magnet as the magnet floats upward. However, an additional constant force is applied to the magnet as the magnet falls down through the connecting arm.

Figure 10:
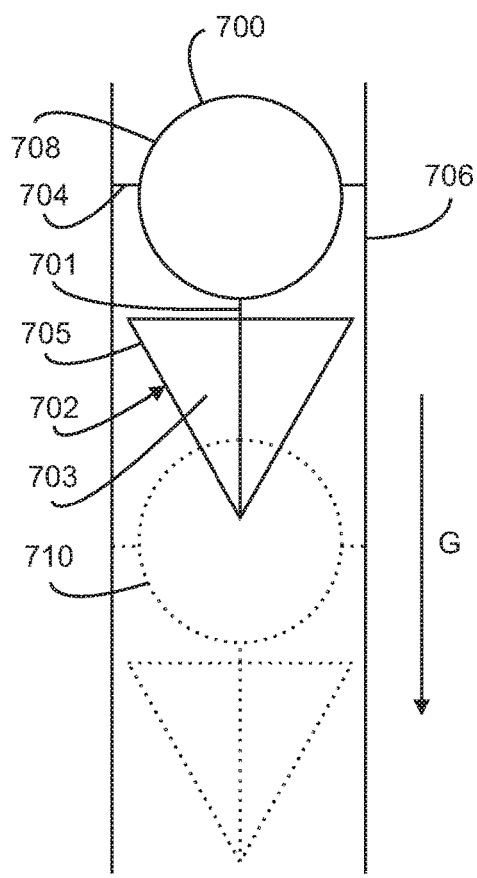
FIG. 10 is a schematic representation of an embodiment of a ballast drag biasing member for use in a reciprocating electrical generator.

As illustrated in FIG. 10, the spherical magnet 700 is attached through a tether 701 to a ballast drag element 702 having a conical shape. The ballast drag element includes a hollow interior 703 that is filled with the working fluid and sides 705 that are formed of a thin material, for example a metal or plastic. The ballast drag element can have an open top, a closed top or holes in the top, sides or bottom. The sides are formed so as to add as little weight as possible and can be selected to have a specific gravity as close as possible to the working fluid. In a first upper position 708, the spherical magnet 700 floats on the surface of the working fluid 704 that has risen up through the connecting arm 706. As the fluid level falls, the spherical magnet falls in the direction of arrow G to a second lower position 710 aided by the weight of the tethered ballast drag element 702 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

Figure 11:
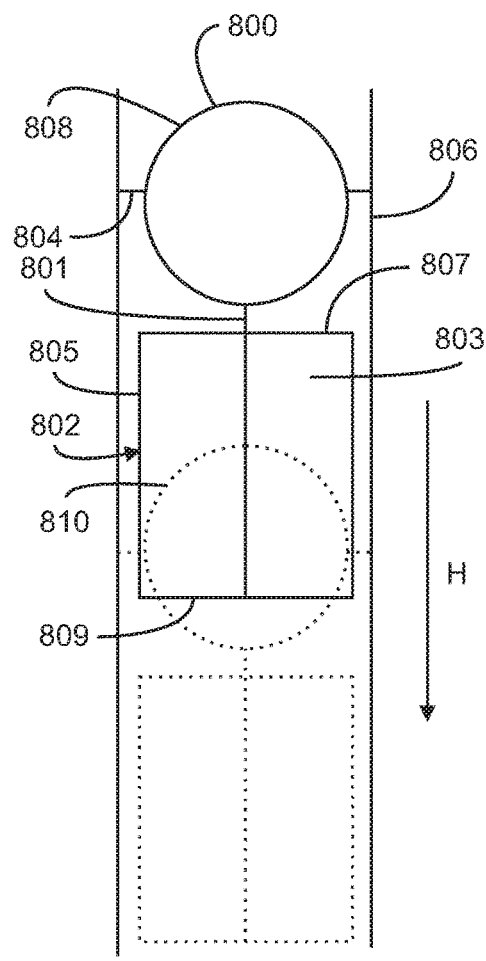
FIG. 11 is a schematic representation of another embodiment of a ballast drag biasing member for use in a reciprocating electrical generator.

In another embodiment as illustrated in FIG. 11, the spherical magnet 800 is attached through a tether 801 to a ballast drag element 802 having a cylindrical shape. The cylinder includes an open top 807 and a closed bottom 809 to which the tether 801 is attached. Alternatively, the cylinder has a closed top or holes in the top, sides or bottom. The ballast drag element includes a hollow interior 803 that is filled with the working fluid and sides 805 that are formed of a thin material for example a metal or plastic. The sides are formed so as to add as little weight as possible and can be selected to have a specific gravity as close as possible or substantially equal to the specific gravity of the working fluid, i.e., the low boiling point liquid. In a first upper position 808, the spherical magnet 800 floats on the surface of the working fluid 804 that has risen up through the connecting arm 806. As the fluid level falls, the spherical magnet falls in the direction of arrow H to a second lower position 810 aided by the weight of the tethered ballast drag element 802 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

While the spherical pressure vessels have been illustrated for use with the continuous vertical conveyor, embodiments of the spherical pressure vessel containing the plurality of reciprocating electrical generators are possible where the spherical pressure vessels are used as pressure tanks or pressure reservoirs that are stationary. The internal reciprocating electrical generators are used to produce electricity from the heat generated during pressurization. In addition, the spherical pressure vessels with reciprocating electrical generators can be used with other embodiments of the engine including embodiments where opposed pairs of spherical pressure vessels are located on either end of a rotating arm. Each spherical pressure vessel is connected to an end of the rotating arm using a swinging connector that maintains the desired vertical orientation of the spherical pressure vessel through 360 degrees of rotation.

Additionally, the ballast drag element itself can be of a higher specific gravity than the working fluid, or, alternatively, can be filled with a higher specific gravity fluid or other material. Therefore, when functioning as a spring or biasing member and increasing the downward force on the spherical or buoy-like configured substantially hollow magnet, the provided for increase in mass contributes to an increased velocity of the buoyant magnets down through the coil wrapped connecting column. This increases the efficiency of the electricity producing mechanism.

In one embodiment, the increased mass of the ballast drag element or drag bucket is preferably configured such that the upward movement of the buoyant and substantially hollow magnets is not significantly impeded. Therefore, the force of buoyancy carrying the buoyant magnet through the coil wrapped connecting column is not significantly counteracted.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:
1. An engine comprising:
a continuous vertical conveyor comprising a pre-determined height;
a plurality of spherical pressure vessels connected to the continuous vertical conveyor for transport by the continuous vertical conveyor to and from the pre-determined height, each spherical pressure vessel comprising an operating pressure sufficient to hold gas at a pre-defined pressure;
at least one gas compressor in communication with each spherical pressure vessel, the gas compressor capable of compressing a gas in each spherical pressure vessel to the pre-defined pressure;
a pressure relief mechanism in communication with each spherical pressure vessel, the pressure relief mechanism capable of returning the gas in each spherical pressure vessel to atmospheric pressure; and
at least one reciprocating electrical generator disposed within each spherical pressure vessel, the reciprocating electrical generator converting heat generated during pressurization of the spherical pressure vessel into electric current.

2. The engine of claim 1, wherein
the continuous vertical conveyor comprises:
a first rotatable wheel;
a second rotatable wheel disposed vertically above the first rotatable wheel; and
a belt disposed around the first rotatable wheel and the second rotatable wheel, wherein rotation of the belt about the first rotatable wheel and the second rotatable wheel moves any given point along the belt to and from the pre-determined height.

3. The engine of claim 1, wherein each spherical pressure vessel comprises a diameter of about six feet.

4. The engine of claim 3, wherein:
the plurality of spherical pressure vessels is attached to the continuous vertical conveyor at a plurality of distinct points along the continuous vertical conveyor; and
adjacent distinct points in the plurality of distinct points are spaced apart by a distance of about seven feet along the continuous vertical conveyor.

5. The engine of claim 1, wherein each reciprocating electrical generator is in communication with the gas compressor to supply electric current to the gas compressor.

6. The engine of claim 1, wherein the pre-determined height comprises at least about 100 feet.

7. The engine of claim 1, further comprising at least one pneumatic powered electric generator in communication with the pressure relief mechanism.

8. The engine of claim 1, wherein the gas comprises argon.

9. The engine of claim 1, wherein the gas at the pre-defined pressure comprises a weight of at least about 5 pounds.

10. The engine of claim 1, wherein each spherical pressure vessel comprises:
a first hemispherical portion having a first flange; and
a second hemispherical portion having a second flange, the first flange attached to the second flange to create the spherical pressure vessel.

11. The engine of claim 10, wherein each spherical pressure vessel maintains a vertical orientation with the first hemispherical portion disposed above the second hemispherical portion at all locations around the continuous vertical conveyor.

12. The engine of claim 10, wherein each spherical pressure vessel further comprises a gasket disposed between the first flange and the second flange.

13. The engine of claim 10, wherein each spherical pressure vessel further comprises a plurality of ports to provide access to an interior of the spherical pressure vessel.

14. The engine of claim 13, wherein each port is disposed in at least one of the first flange and the second flange.

15. The engine of claim 13, wherein:
the gas compressor is in communication with one of the ports in each spherical pressure vessel; and
the pressure relief mechanism is in communication with one of the ports in each spherical pressure vessel.

16. The engine of claim 13, wherein each reciprocating electrical generator further comprises electrical leads, the electrical leads passing through at least one of the ports in the spherical pressure vessel containing the reciprocating electrical generator.

17. The engine of claim 1, wherein the engine further comprises a pair of reciprocating electrical generators disposed in each spherical pressure vessel.

18. The engine of claim 17, wherein:
each reciprocating electrical generator in each pair of reciprocating electrical generators comprises:
two containers arranged in a vertical alignment and having a top container and a bottom container;
a generally cylindrical connecting arm in communication with each container and comprising a central hollow bore, the top container and bottom container in fluid communication through the central hollow bore;
a volume of a low boiling point liquid disposed in the bottom container;
a wire coil wrapped around a portion of the connecting arm; and
a buoyant spherical magnet disposed in the central hollow bore; and
the engine further comprises an active heat exchanger in each spherical pressure vessel, each active heat exchanger in communication with the bottom containers of the pair of reciprocating electrical generators contained in a given spherical pressure vessel to add heat to and remove heat from each bottom container and to transfer heat between the bottom containers in the pair of reciprocating electrical generators.

19. The engine of claim 18, wherein each active heat exchanger comprises:
a pair of first heat exchanger portions, each first heat exchanger portion in communication with the liquid disposed in one of the bottom containers; and
a pair of second active heat exchanger portions, each second active heat exchanger portion disposed in one of the bottom containers in a gas space above the liquid.

20. The engine of claim 19, wherein each active heat exchanger further comprises:
an internal additional heat exchanger portion in communication with an internal ambient environment of the spherical pressure vessel; and
an external additional heat exchanger portion in communication with an external ambient environment of the spherical pressure vessel, the internal additional heat exchanger portion and external additional heat exchanger portion transferring heat among the internal ambient environment, the external ambient environment and the bottom containers.

* * * * *